US012403485B2

(12) United States Patent
Fluegge et al.

(10) Patent No.: US 12,403,485 B2
(45) Date of Patent: Sep. 2, 2025

(54) SANITARY SHOWER WITH A PULSATION DISC

(71) Applicant: Grohe AG, Hemer (DE)

(72) Inventors: Simon Fluegge, Dortmund (DE); Sascha May, Bochum (DE)

(73) Assignee: GROHE AG, Hemer (DE)

( * ) Notice: Subject to any disclaimer, the term of this patent is extended or adjusted under 35 U.S.C. 154(b) by 367 days.

(21) Appl. No.: 17/639,994

(22) PCT Filed: Jul. 21, 2020

(86) PCT No.: PCT/EP2020/070587
§ 371 (c)(1),
(2) Date: Mar. 3, 2022

(87) PCT Pub. No.: WO2021/043495
PCT Pub. Date: Mar. 11, 2021

(65) Prior Publication Data

US 2022/0323972 A1 Oct. 13, 2022

(30) Foreign Application Priority Data

Sep. 3, 2019 (DE) ......................... 102019123535.9

(51) Int. Cl.
*B05B 1/08* (2006.01)
*B05B 1/16* (2006.01)
*B05B 1/18* (2006.01)

(52) U.S. Cl.
CPC ............ *B05B 1/083* (2013.01); *B05B 1/1636* (2013.01); *B05B 1/18* (2013.01)

(58) Field of Classification Search
CPC .......... B05B 1/18; B05B 1/083; B05B 1/1636
(Continued)

(56) References Cited

U.S. PATENT DOCUMENTS 3,929,287 A * 12/1975 Givler .................... B05B 1/1663 239/389
6,648,245 B1 * 11/2003 Samwell ................... B05B 3/04 239/524

(Continued)

FOREIGN PATENT DOCUMENTS

AU 461101 3/1974
CH 540065 8/1973

(Continued)

OTHER PUBLICATIONS

International Search Report dated Oct. 21, 2020 in International (PCT) Application No. PCT/EP2020/070587.

*Primary Examiner* — Jason J Boeckmann
(74) *Attorney, Agent, or Firm* — Wenderoth, Lind & Ponack, L.L.P.

(57) ABSTRACT

A sanitary shower (1), at least comprising:

a housing (2) having at least one feed duct (4) for a liquid, opening into a pulsator chamber (3), a spray plate (5) having a great number of outlet nozzles (6) for the liquid, a plurality of chambers (7, 8), each of which is connected to the pulsator chamber (3) via a chamber inlet (9, 10), wherein the liquid can be supplied through each of the chambers (7, 8) to at least one outlet nozzle (6) of the spray plate (5), and a pulsator disk (11) arranged in the pulsator chamber (3) and movable by the liquid in such a way that the pulsator disk (11) can at least partially close at least one of the chamber inlets (9, 10) in an alternating manner.

8 Claims, 2 Drawing Sheets

(58) Field of Classification Search
USPC .......................................... 239/381, 382, 389
See application file for complete search history.

(56) References Cited

U.S. PATENT DOCUMENTS

| | | | | |
|---|---|---|---|---|
| 9,168,542 | B2 * | 10/2015 | Lin | B05B 1/18 |
| 9,616,433 | B2 * | 4/2017 | Hayata | B05B 1/083 |

FOREIGN PATENT DOCUMENTS

| | | | | |
|---|---|---|---|---|
| DE | 10 2008 015 969 | | 9/2009 | |
| DE | 102008015969 | A1 * | 9/2009 | B05B 1/1627 |
| DE | 10 2017 223 395 | | 12/2018 | |
| GB | 2 343 854 | | 5/2000 | |

* cited by examiner

SANITARY SHOWER WITH A PULSATION DISC

This invention relates to a sanitary shower for a sanitary fitting. Sanitary fittings are used in particular to provide a liquid, such as water, on demand at a sink, a washbasin, a shower or a bathtub.

Sanitary showers for sanitary fittings can, for instance, be designed in the manner of overhead showers or hand showers and/or are used to distribute the liquid delivered by the sanitary fitting over a large area. The liquid can be dispensed through the sanitary showers in at least one spray pattern, for instance, in the form of rain spray, full-body spray or pearl spray. However, the disadvantage of the sanitary showers is that at low liquid pressure the spray patterns are only faint.

Therefore, the invention addresses the problem of solving at least a part of the issues described with reference to the prior art and, in particular, of providing a sanitary shower, which can fully form the spray even at a weak liquid pressure.

This problem is solved by a sanitary shower according to the features of the independent claim. Further advantageous embodiments of the invention are specified in the dependent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

A sanitary shower having at least the components listed below contributes to meeting the objective:

- a housing having at least one feed duct for a liquid opening into a pulsator chamber,
- a spray plate having a large number of outlet nozzles for the liquid,
- a plurality of chambers, each of which is connected to the pulsator chamber via a chamber inlet, wherein the liquid can be supplied through each of the chambers to at least one outlet nozzle of the spray plate, and
- a pulsator disk arranged in the pulsator chamber and movable by the liquid in such a way that the pulsator disk can at least partially close at least one of the chamber inlets in an alternating manner.

The sanitary shower can be used in particular for sanitary fittings. Sanitary fittings are used in particular to supply liquids, such as in particular water, to sinks, washbasins, showers and/or bathtubs as required. For this purpose, cold water at a cold-water temperature and hot water at a hot-water temperature can be supplied to the sanitary fittings, which cold water and hot water can be mixed by the sanitary fittings, for instance by means of a mixing valve or a thermostatic mixing cartridge, to form a mixed water having a desired mixed water temperature. The cold-water temperature is in particular at most 25° C. (Celsius), preferably 1° C. to 25° C., particularly preferably 5° C. to 20° C. and/or the hot-water temperature is in particular at most 90° C., preferably 25° C. to 90° C., particularly preferably 55° C. to 65° C. The mixed water can then be routed, for instance by means of a liquid line or a liquid hose, to the sanitary shower, which may be formed in the way of an overhead shower or a hand shower. The sanitary shower can be secured to a support, such as a wall, or be moved by a user. The sanitary shower can be used to spray the liquid, e.g. water, in particular in at least one spray pattern.

For this purpose, the sanitary shower has a housing having at least one feed duct. The housing can be at least partially made of metal and/or plastic.

The liquid can be supplied to the sanitary shower via the at least one feed duct. For this purpose, the at least one feed duct can be connected in particular to the liquid line or the liquid hose of the sanitary fitting. The at least one feed duct opens into a pulsator chamber of the housing. The pulsator chamber is a mounting chamber for a pulsator disk in the housing.

To form the at least one spray pattern, the sanitary shower has a spray plate having a plurality of outlet nozzles for the liquid. The spray plate can be designed as part of the housing or as a separate component. In particular, the spray plate may be disk-shaped and/or formed on an underside of the housing. The outlet nozzles can be formed, in particular, in the manner of openings in the spray plate.

The outlet nozzles for the liquid are assigned to a plurality of chambers of the sanitary fitting 1, through which the liquid can be supplied to the outlet nozzles. In particular, a plurality of the outlet nozzles, for instance, two to ten outlet nozzles, is assigned to every chamber. In that way, liquid can only be supplied to the outlet nozzles via the individually assigned chamber.

Each chamber has a chamber inlet, through which the chambers are connected to the pulsator chamber. In this way, the liquid can flow from the pulsator chamber into the individual chambers via the chamber inlets and be supplied to the outlet nozzles assigned to the individual chambers. In particular, the chambers are cavities in the housing, which may be formed, for instance, on a rear end of the spray plate.

A pulsator disk is arranged in the pulsator chamber, which pulsator disk can be moved by the liquid in such a way that the pulsator disk can alternately at least partially or completely close at least one of the chamber inlets. In particular, the pulsator disk is moved exclusively by the flow energy of the liquid flowing into the pulsator chamber. The chamber inlets of the chambers are in particular connected to the pulsator chamber in a circular manner and/or formed below a bearing point of the pulsator disk. The liquid can move the pulsator disk in particular in such a way that it wobbles or rotates about its bearing point. As a result, the individual chamber inlets are successively closed by the pulsator disk or a side wall of the pulsator disk in a clockwise or counterclockwise direction, at least partially or completely. In that way, the chambers are (only) alternately flushed with liquid by the pulsator disk in a rotatory manner, or only a part of the plurality of chambers is opened or at least partially closed. In this way, strong liquid jets can be generated through the outlet nozzles even at low liquid pressure of the inflowing liquid.

The pulsator disk can be designed in the way of a disk. In particular, the pulsator disk is designed as a circular disk and/or consists at least partially of plastic or metal. Furthermore, the pulsator disk may have a diameter of 10 mm to 60 mm and/or a thickness of 1 mm to 10 mm.

The pulsator disk can be mounted on a fulcrum. For this purpose, the pulsator chamber can have a bearing, which is used to support the pulsator chamber in a point-like manner. For this purpose, the pulsator disk, in particular its center, can rest on a tip of the bearing. On the tip of the bearing, the pulsator disk can be tilted in particular in any direction.

The pulsator disk may be movable by the fluid orbiting about its center.

The pulsator disk can be secured by a spring. The spring can in particular press the pulsator disk onto the bearing. In this way, any annoying noise from the pulsator disk in the pulsator chamber can be prevented. The spring can, for instance, be designed in the way of a coil spring.

The chamber inlets may be located at a central point of the spray plate and the chambers may extend radially outwards from the chamber inlets. In particular, this means that the chamber inlets are formed in a central area of the spray plate in the pulsator chamber. The chambers extend in particular at least partially across a rear end of the spray plate.

The chambers can be triangular in shape. In particular, this can mean that the chambers have a (largely) triangular base in parallel to the rear end of the spray plate. Based on the triangular design of the chambers, the plurality of chambers can be used to cover the entire rear end of the spray plate particularly easily.

The chamber inlets of the chambers can be at least partially closable by the pulsator disk in a rotatory alternating manner. In particular, this can mean that adjacent chamber inlets can be at least partially closed in succession by the pulsator disk.

In particular, a discharge of the liquid from the outlet nozzles cannot be interrupted during the at least partial closing of the chamber inlets. This can mean in particular that even when the chamber inlets are at least partially closed, the outflow of liquid from the outlet nozzles is not interrupted.

The diameter of the pulsator disk can be made sufficiently small for the pulsator disk to rotate at a frequency of at least 0.5 Hz (Hertz) at a fluid pressure of 1 bar.

The chambers may be separated from one another by at least one chamber boundary. The at least one chamber boundary may be a partition that prevents the flow of fluid between individual chambers.

The invention and the technical environment are explained in more detail below with reference to the figures. It should be noted that the figures show a particularly preferred embodiment variant of the invention, but the invention is not limited thereto. The same reference signs are used for the same components in the figures. In an exemplary and schematic manner FIG. 1 shows a longitudinal section of a sanitary shower;

Figure 1:
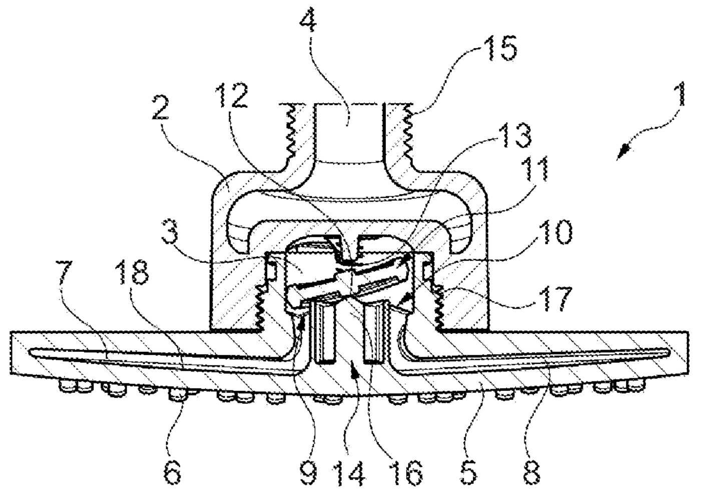

FIG. 1 shows a longitudinal section of a sanitary shower 1. The sanitary shower 1 may be a hand shower or a ceiling-mount showerhead for a shower. The sanitary shower 1 comprises a housing 2, which is designed here in the manner of a component the flow is directed against. A feed duct 4 for a liquid is formed in the housing 2, which opens into a pulsator chamber 3 of the housing 2. To feed the liquid, the housing 2 can be connected to a feed line (not shown here) via a first thread 15. A pulsator disk 11 is arranged in the pulsator chamber 3, which pulsator disk is mounted at its center 12 in a point-like manner on a bearing 16 and is pressed against the bearing 16 by a spring 13. A second thread 17 is used to connect the housing 2 to a spray plate 5. The spray plate 5 has a plurality of outlet nozzles 6 assigned to chambers through which the liquid can be fed to the outlet nozzles 6. A plurality of outlet nozzles 6 are assigned to each of the individual chambers. The sanitary shower 1 shown here has a total of ten chambers, of which, however, only a first chamber 7 and a second chamber 8 can be seen in FIG. 1. The chambers of the sanitary shower 1 extend on a rear end 18 of the spray plate 5 across all outlet nozzles 6, such that the chambers can supply liquid to all outlet nozzles 6. For this purpose, the chambers may extend (largely) across the entire rear face 18 of the spray plate 5. The first chamber 7 has a first chamber inlet 9, which is used to connect the first chamber 7 to the pulsator chamber 3. Accordingly, the second chamber 8 has a second chamber inlet 10, which is used to connect the second chamber 8 to the pulsator chamber 3. The remaining chambers of the sanitary shower 1 are formed identically to the first chamber 7 and the second chamber 8. The chamber inlets of the chambers are formed ring-like in a central point 14 of the spray plate 5 and below the pulsator disk 11. During operation of the sanitary fitting 1, the liquid flows tangentially into the pulsator chamber 3 via the feed duct 4 and forms a liquid vortex in the pulsator chamber 3. As a result, the pulsator disk 11 is tilted circumferentially by its point-like bearing on the bearing 16, such that the pulsator disk 11 successively and at least partially closes the adjacent chamber inlets.

This at least partially prevents the liquid from flowing from the pulsator chamber 3 into the individual chambers.

Figure 2:
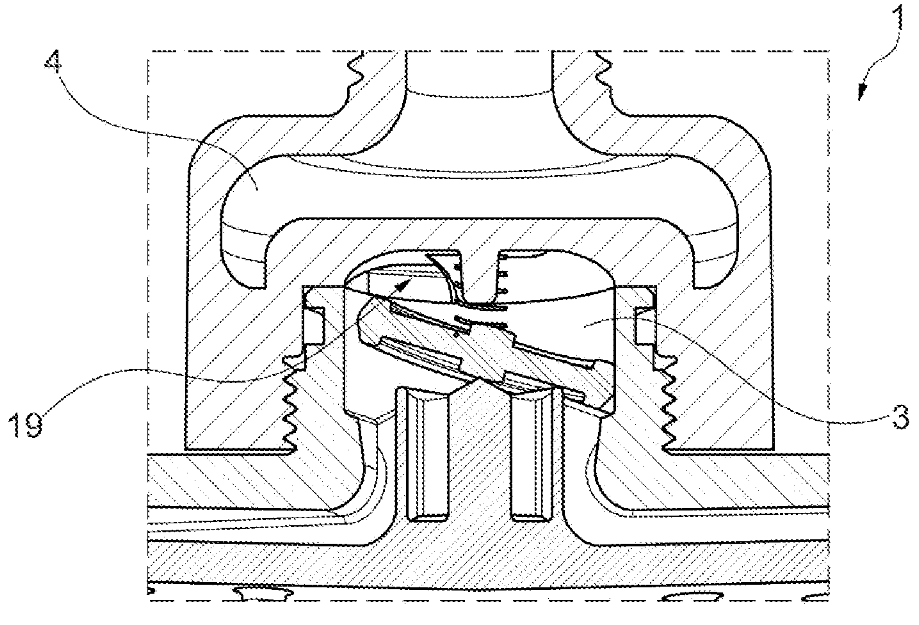
FIG. 2 shows a detailed perspective view of the sanitary shower.

FIG. 2 shows a perspective detailed view of the sanitary fitting 1. There, in particular, a tangential opening 19 of the feed duct 4 into the pulsator chamber 3 can be seen, through which a vortex-shaped flow can be formed in the pulsator chamber 3.

Figure 3:
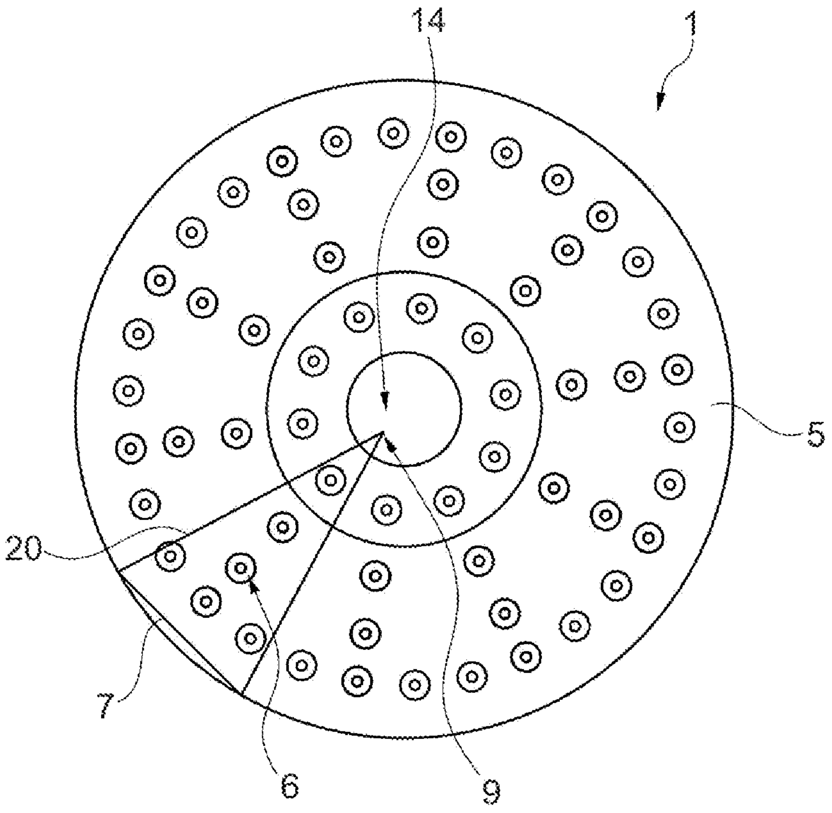
FIG. 3 shows a top view of the sanitary shower.

FIG. 3 shows a top view onto the sanitary fitting 1 viewed in the direction of the spray plate 5. In FIG. 3, only the first chamber 7 is shown in a schematic manner and by way of example. The first chamber 7 is triangular in shape and extends radially outwards from its first chamber inlet 9. The other chambers (not shown here) are of identical design and are arranged next to each other and in a circle around the central point 14 of the spray plate 5. Six outlet nozzles 6 are assigned to each of the individual chambers, to which outlet nozzles the relevant chamber can conjointly supply liquid. The individual chambers are separated from each other by a chamber partition 20 in the manner of partition walls, such that no liquid can flow between the individual chambers.

This invention permits the jets formed by the exit nozzles to be fully formed even at a weak fluid pressure.

LIST OF REFERENCE NUMERALS

1 Sanitary shower
2 Housing
3 Pulsator chamber
4 Feed duct
5 Spray plate
6 Outlet nozzles
7 first chamber
8 second chamber
9 first chamber inlet
10 second chamber inlet
11 Pulsator disk
12 Center
13 Spring
14 Central point
15 first thread
16 Bearing
17 second thread
18 rear end
19 Mouth
20 Chamber delimitation

The invention claimed is:

1. A sanitary shower (1), comprising:

a housing (2) comprising at least one feed duct (4) for a liquid, opening into a pulsator chamber (3), a spray plate (5) comprising a plurality of outlet nozzles (6) for the liquid, ten isosceles triangular shaped chambers (7, 8), each of which is connected to the pulsator chamber (3) via a chamber inlet (9, 10), wherein the chamber inlets (9, 10) are located in a central point (14) of the spray plate (5) and the ten isosceles triangular shaped chambers (7, 8) extend radially outwards from the chamber inlets (9, 10) and comprise a vertex and two legs in which the vertex is at the central point (14) of the spray plate (5) and the two legs extend radially outwards, and wherein the liquid is supplied through each of the ten isosceles triangular shaped chambers (7, 8) to six outlet nozzles (6) of the spray plate (5), and four of the six outlet nozzles (6) are located along a symmetry axis of each isosceles triangular shaped chamber and three of the six outlet nozzles (6) are located in a circumferential direction of the spray plate (5), and a pulsator disk (11) arranged in the pulsator chamber (3) and movable by the liquid in such a way that the pulsator disk (11) can at least partially close at least one of the chamber inlets (9, 10) in an alternating manner.

2. The sanitary shower (1) according to claim 1, wherein the pulsator disk (11) is designed in the manner of a disk.

3. The sanitary shower (1) according to claim 1, wherein the pulsator disk (11) is mounted on a point bearing.

4. The sanitary shower (1) according to claim 1, wherein the pulsator disk (11) is movable by the fluid orbiting about its center (12).

5. The sanitary shower (1) according to claim 1, wherein the pulsator disk (11) is secured by a spring (13).

6. The sanitary shower (1) according to claim 1, wherein the chamber inlets (9, 10) of the isosceles triangular shaped chambers (7, 8) can be at least partially closable by the pulsator disk (11) in a rotatory alternating manner.

7. The sanitary shower (1) according to claim 1, wherein a discharge of the liquid from the outlet nozzles (6) is not interrupted during the at least partial closing of the chamber inlets (9, 10).

8. The sanitary shower (1) according to claim 1, wherein the chambers (7, 8) are separated from one another by at least one chamber boundary (20).

* * * * *